United States Patent [19]

Waldecker

[11] 4,064,632
[45] Dec. 27, 1977

[54] TIRE CALIPER

[76] Inventor: Donald E. Waldecker, 112 Gordon Road, Falls Church, Va. 22046

[21] Appl. No.: 718,383

[22] Filed: Aug. 27, 1976

[51] Int. Cl.² .................. E21B 47/08; G01B 5/00
[52] U.S. Cl. ........................... 33/143 D; 33/178 R
[58] Field of Search .......... 33/143 R, 143 D, 143 M, 33/143 J, 143 K, 147 J, 147 T, 158, 178 R

[56] References Cited

U.S. PATENT DOCUMENTS

| 413,779 | 10/1889 | Griffin | 33/147 T |
| 1,238,535 | 8/1917 | Lewis | 33/143 D |
| 2,059,740 | 11/1936 | Minchew | 33/143 K |
| 2,566,435 | 9/1951 | Trimmer | 33/143 D |
| 2,841,874 | 7/1958 | Richardson | 33/143 D |
| 3,029,519 | 4/1962 | Kusmer et al. | 33/168 A |
| 3,827,153 | 8/1974 | Mitchell | 33/180 AT |

FOREIGN PATENT DOCUMENTS 779,246  7/1957  United Kingdom ............... 33/147 J

*Primary Examiner*—Harry N. Haroian
*Attorney, Agent, or Firm*—Glenn E. Wise

[57] ABSTRACT

A tire caliper that can be made of very few parts and that can be very quickly and easily used to compare the diameters of the road engaging tread portions of a plurality of tires.

5 Claims, 8 Drawing Figures

U.S. Patent   Dec. 27, 1977   Sheet 1 of 2   4,064,632
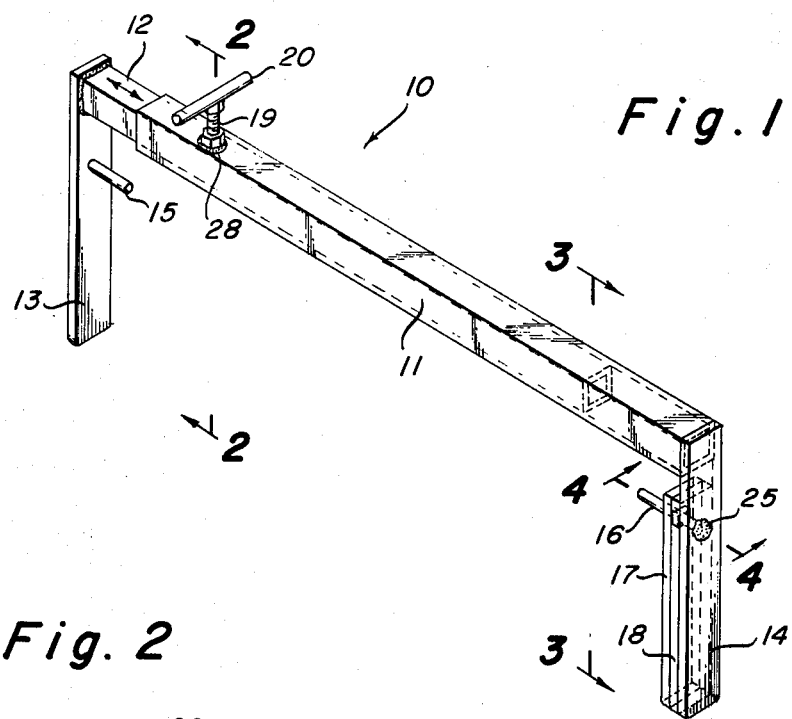
Fig. 1
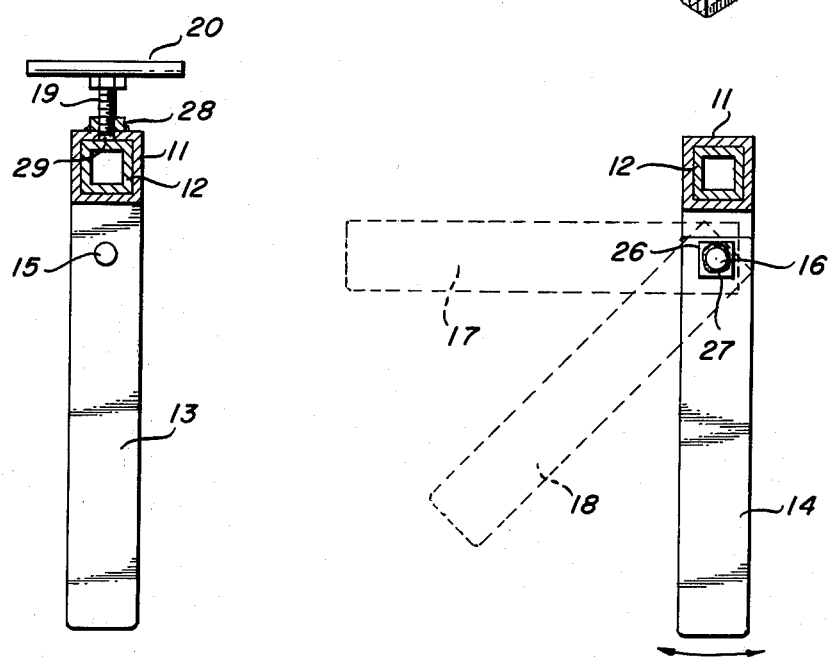
Fig. 2
Fig. 3
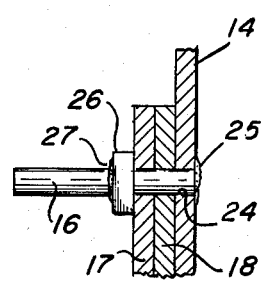
Fig. 4

TIRE CALIPER

BACKGROUND OF THE INVENTION

The present invention relates to a tire tool and more particularly to a tire caliper for comparing the diameters of a plurality of tires that should be matched for use.

Motor vehicle tires, supposedly of the same size, often vary considerably in diameter when new. Also tires on a vehicle frequently wear at unequal rates. The resulting differences in diameters between tires that are used on the same axle or on plural axles can unfavorably alter the caster and camber of the wheels and the braking of the vehicle and can lead to severe tire wear. Also with the increasing use, on motor vehicles, of limited-slip differentials and front-wheel drives it is more important than ever that motor vehicle mechanics and operators have a simple device when they can use to compare the diameters of tires frequently, so that the tires may be interchanged or replaced as necessary to maintain matched or substantially matched diameter tires on each axle. If, for example, the tires on opposite ends of an axle including a limited slip differential are not of substantially equal diameter, then the differential is always slipping unnecessarily which causes excessive wear thereof.

Gages for measuring and comparing the diameters of tires are known in the prior art; U.S. Pat. Nos. 2,566,407; 2,566,435; 2,841,874 and 3,783,523 are mentioned by way of example. However, although each of the devices of this type known to me can be used to measure the outside diameter of a tire, all of them are somewhat complex and include a considerable number of parts which increases manufacturing problems and costs. They are also cumbersome, and because of this and their intricacies they are somewhat difficult and inconvenient to use

SUMMARY OF THE INVENTION

The primary object of the present invention is to provide a tire caliper which is simple to manufacture and can be made available at relatively low cost, which does not require any special skill in its employment, and which can be used very quickly for accurately matching tires with respect to their diameters. Another object of the invention is to provide means whereby the difference in diameters between a tire being calipered and a tire previously calipered can be measured with a fair degree of accuracy.

Another object of the invention is to provide means which can make immediately apparent the approximate difference between the diameter of a tire being calipered and the diameter of a tire calipered previously.

Another object of the invention is to provide a tire caliper that can be quickly placed in proper position to give an accurate calipering of a tire.

These and other objects are achieved by a tire caliper including a telescoping tube assembly that can be slidably adjusted to be coextensive with the diameter of a tire. A positioning arm at one end and a gaging arm at the other end of the telescoping tube assembly are arranged to embrace the tire. Projections provided on each arm constrain the operator to align the device, when using it on a mounted tire, in a position in which there can be no interference from the wheel cover, hub cap or hub of a wheel. Releasable clamping means on the telescoping tube assembly insure that it can be temporarily fixed in a desired position. For example, the operator can lock the caliper with a span corresponding to the diameter of one tire; he can then withdraw the caliper and move it into position to caliper another tire. If the operator must then release the clamp and adjust the caliper for a greater or lesser span, it is immediately obvious that the second tire diameter is greater or lesser respectively, than the first tire diameter.

As one feature of the invention, there is provided on the gaging arm a set of swingable gaging elements which the operator can optionally dispose between the gaging arm and the tire to immediately ascertain the approximate difference between the diameter of a particular tire and the diameter of a tire previously calipered provided that the diameters of the two tires being compared are not too different.

In one embodiment of the invention, the end of the adjustable telescoping tube assembly opposite the end having the gaging arm is bifurcated and two positioning arms with the projections referred to above are provided. This arrangement constrains the operator to position the caliper across an exact diameter of the tire.

BRIEF DESCRIPTION OF THE DRAWING

Further objects and advantages and a better understanding of the invention may be had from the following detailed description taken in connection with the accompanying drawing, wherein:

FIG. 1 is a perspective view of a first embodiment of a tire caliper illustrating principles of the invention;

FIG. 2 is a sectional view, taken at 2—2 In FIG. 1;

FIG. 3 is a sectional view taken at 3—3 in FIG. 1 but in addition illustrating pivotal movement of the gaging elements;

FIG. 4 is a partial sectional view taken at 4—4 in FIG. 1;

DETAILED DESCRIPTION OF THE DRAWING

Figure 5:
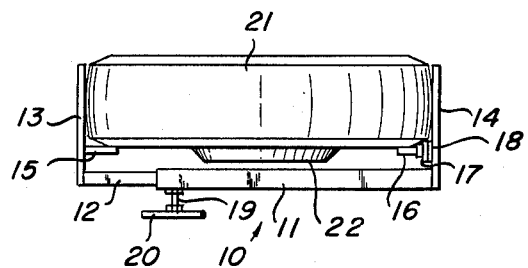
FIG. 5 is a view looking downward and showing one manner of positioning the caliper for gaging a tire.
Figure 6:
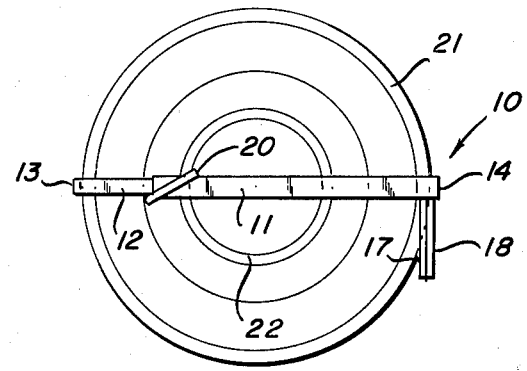
FIG. 6 is an elevational view of the caliper positioned to caliper a tire in the same manner as in FIG. 5.

With reference to FIG. 1, a tire caliper illustrating a first embodiment of the present invention is designated in its entirety by the reference numeral 10. The device comprises a first hollow tubular portion 11 and a second hollow tubular portion 12. The tubular portions 11 and 12 can be made of metal or rigid plastic, although metal is preferred. The second portion 12 is preferably of non-circular cross section and has one of its ends slidably received in one end of complementary tubular portion 11. As shown in FIG. 1 and FIG. 2, there is affixed, by welding, or the like, at the free end of the first tubular portion 11 a positioning arm 13 which is disposed at a right angle to the common longitudinal axis of the tubular portions 11 and 12 and which is parallel to a gaging arm 14. Gaging arm 14 is affixed by means of welding, or the like to the free end of tubular portion 11, and forms with elements 11, 12 and 13 a U-shaped construction. At corresponding locations on each of arms 13 and 14 there are provided projections identified as pins 15 and 16 respectively, for a purpose to be described hereinafter. Each of pins 15 and 16 is disposed at a right angle to the arm of which it originates, and extends in the direction of the other and opposite arm parallel to the common longitudinal axis of portions 11 and 12. As shown in FIG. 1, 3, 4, 5, 6, 7, and 8 there is pivotally mounted on the pin 16 a plurality of swingable gaging elements designated as 17 and 18. Elements 17 and 18 are thus movable relative to the arm 14 and thereby adapted for optional disposition to lie at an angle to the arm 14 as in FIG. 5 and FIG. 6 or parallel to the arm 14 as in FIG. 7. The gaging elements are comprised of flat plates sized in such a way that the thickness of each represents a selected unit of measurement, such as ¼ inch. Pin 16 is rigidly affixed relative to arm 14 as shown in FIG. 4 wherein one end of pin 16 is seen fitted in an aperture 24 in arm 14 where it is held by a weldment 25. Pin 15 may be attached to arm 13 in the same way. Element 26 in FIG. 4 designates a collar which is welded to pin 16 by means of weldment 27 and prevents gaging elements 17 and 18 from moving axially off of pin 16. Collar 26 is located so as to allow elements 17 and 18 to swing freely, but allows for only minute movement of elements 17 and 18 along pin 16.

The tire caliper 10 also includes clamping means for locking portions 11 and 12 temporarily together in an adjusted position. This may be, for example, a clamping bolt 19 having a welded-on handle 20 and threadedly engaged in a nut 28 welded to portion 11. Portion 11 includes an aperture 29 aligned with the axis of the hole in nut 28 which aperture is large enough so that bolt 19 can be screwed downward whereby its lower end may be caused to bear firmly against portion 12 to thereby lock elements 11 and 12 together in various positions as desired by a user when portion 12 is telescoped beyond bolt 19 into portion 11.

Figure 8:
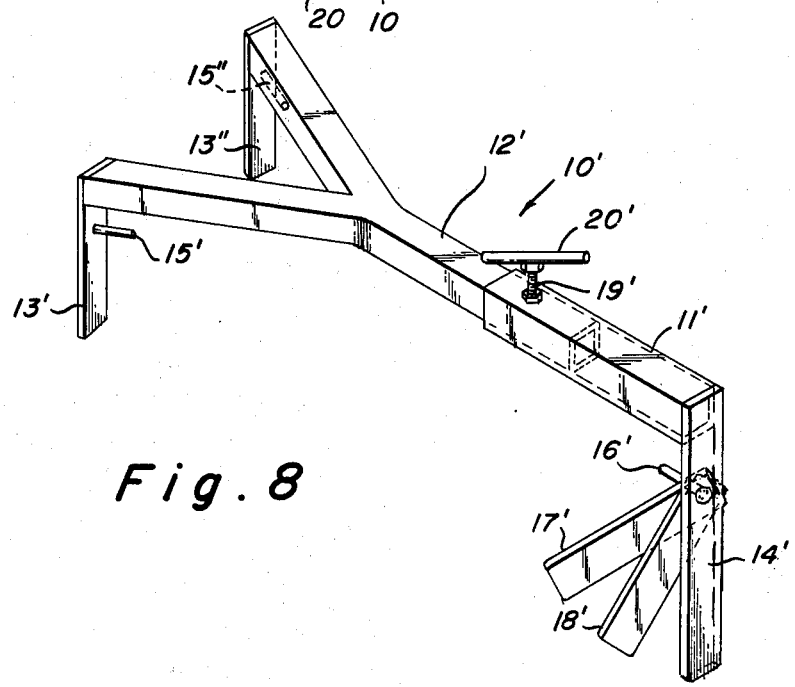
FIG. 8 is a perspective view of a tire caliper showing another embodiment of the invention.

Another embodiment of the invention shown in FIG. 8, comprises a hollow tubular portion 12' corresponding to the hollow tubular portion 12 of the embodiment of FIG. 1 but having its free end bifurcated and terminating in two positioning arms 13' and 13". Pins 15' and 15" corresponding to pin 15 in FIG. 1 are rigidly carried by arms 13' and 13". The locking means and other elements carried by hollow tubular portion 11' in FIG. 8 correspond to like elements in FIG. 1 and are denoted with primed numbers.

METHOD OF USE

One method whereby the device of the present invention may be used to compare the diameters of tires is as follows: With reference to FIG. 1, the portion 12 is initially pulled in a direction to move it outward of the shaft portion 11 until the elements 13 and 17 are spaced apart enough to span at least diametrically opposite tread portions of the first tire to be calipered. The operator then holds both of the swingable gaging elements 17 and 18 aligned with the gaging arm 14 and places the device squarely against the tire across one of its diameters, preferably so that the portions 11 and 12 are substantially horizontal and with the arm 13 abutted against the wearing surface of the tread of the tire. The operator now moves the gaging arm 14 with the aligned gaging elements carried by pin 16 toward the tire by sliding the portion 11 onto portion 12 until gaging element 17 touches the wearing tread surface of the tire diametrically opposite the wearing tread portion engaged by positioning arm 13 in such manner that the caliper closely embraces the tire. Next the releasable clamping means is tightened and the span of the caliper between elements 13 and 17 is thereby fixed to correspond to the diameter of the tire. With the portions 11 and 12 locked together, the operator then withdraws the caliper from the first tire while continuing to hold in place the gaging elements 17 and 18 aligned with the gaging arm 14 and then similarly places the caliper adjacent to a second tire that is to be compared to the first. If the diameter of the second tire is substantially less than that of the first, a gap will be apparent between element 17 and the wearing tread surface immediately adjacent to element 17 and the operator can estimate or measure, with a ruler, or the like the actual difference between the diameters of the first and second tires. If, instead, the diameter of the second tire is greater than that of the first tire, the operator can allow one or more of the gaging elements 17 and 18 in alignment with the gaging arm to pivot by gravity away from alignment with arm 14 so that the span of the caliper 10 is increased sufficiently to permit the caliper to embrace the larger tire. If the gaging elements 17 and 18 are each ¼ inch thick as suggested above and it was necessary to allow both elements to pivot out of the way in order to span the second tire snugly between arms 13 and 14 then the diameter of the second tire would be very close to ½ inch larger than the diameter of the first tire, for example.

Usually a difference in the diameters of the tires being compared will be apparent from the number of swingable gaging elements which must be inserted in or dropped from the span of the caliper. However, if necessary, the operator also has the option of releasing the clamping means and making suitable readjustment of the span of the caliper so that another gaging can be made which will allow the difference in diameters of the tires to be measured by utilizing the swingable gaging elements 17 and 18 and/or the gaging arm 14.

It should be pointed out that word diameter referred to throughout this specification relates to the outside diameter of a tire taken from one wear tread portion to another wear tread portion located 180° around the tire.

Figure 7:
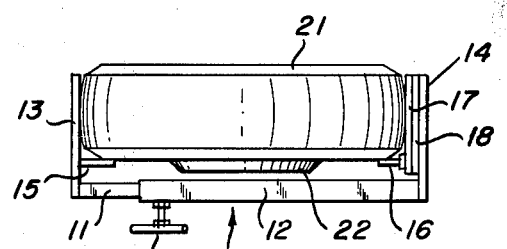
FIG. 7 is a view looking downward and showing another manner of positioning the caliper for gaging the diameter of a tire.

The projections, such as pins 15 and 16 are particularly useful if it is desired to measure the diameter of a tire mounted on a wheel, the hub, hub cap, or wheel cover 22 of which could interfere with ideal positioning of the caliper. As illustrated in FIG. 5 and FIG. 7, these projections are so placed on each of arms 13, 14, 13', 13" and 14' so that when the caliper is placed in position against the diameter of a mounted tire 21, the projections abut against the side of the tire and thereby hold the caliper far enough away from the wheel that the telescoped portions 11 and 12 bridge the wheel hub, hub cap, or wheel cover 22.

In using the embodiment shown in FIG. 8 to caliper a first tire, the clamping means are first released and the combination of portions 11' and 12' is extended so that gaging space of the caliper 10' spans a distance greater than the diameter of the tire. The caliper is then placed against the side of the tire in such a manner that the positioning arms 13' and 13" on the bifurcations of portion 12' abut the wearing surface of the tread of tire 21, whereby the telescoped ends of portions 11' and 12' are positioned to cross the center of the tire. The operator then moves the gaging element 17' toward the positioning arms 13' and 13" until the caliper 10' closely embraces diametrically opposite wear tread portions of the tire 21. In using this FIG. 8 caliper embodiment the operator has the same options for employing the swingable gaging elements and clamping mechanism as previously recited with regard to the FIG. 1 embodiment.

After the caliper of FIG. 8 has been used it may be disassembled if desired by releasing the clamping means and completely disengaging the portion 11' and 12'. The separated members can then be stacked together for convenient storage, for example, in a garage or motor vehicle. The caliper embodiment of FIG. 1 can be disassembled in the same manner for storage, if desired.

While the present invention has been described in connection with particular embodiments thereof, it will be understood by those skilled in the art that changes and modifications can be made without departing from the spirit and scope of the following claims:

What is claimed is:

1. A caliper for comparing the diameters of the wear treads of a plurality of tires comprising: first and second telescopically engaged and adjustable portions each having at least one exposed end; a first arm affixed to one exposed end on the first of said portions; a second arm affixed to one exposed end on the second of said portions; a projection on said first arm extending toward a projection on said second arm; said arms and said projections being oriented relative to said portions and relative to each other so that said arms can be caused to engage spaced wear tread portions of a tire when said projections are caused to engage the same side of said tire; and gaging means pivotally mounted on one of said projections which can be disposed between the arm upon which said one projection is carried and a wear tread portion of said tire at the option of a user.

2. The combination of claim 1 wherein said first and second portions form the bight and said first and second arms form the legs of a U.

3. The combination of claim 1 including releasable clamping means on said caliper for temporarily locking said portions together at various adjusted positions.

4. The combination of claim 1, one of said portions including at least two exposed ends with each of the lastmentioned ends having an arm affixed thereto and with each of said last-mentioned arms having a projection extending therefrom.

5. The combination of claim 4 wherein said one portion is a Y-shaped element.

* * * * *